United States Patent
Kim et al.

(10) Patent No.: US 8,519,596 B1
(45) Date of Patent: Aug. 27, 2013

(54) GRAPHENE TRIBOELECTRIC CHARGING DEVICE AND A METHOD OF GENERATING ELECTRICITY BY THE SAME

(71) Applicant: K-Technology USA, Inc., Pico Rivera, CA (US)

(72) Inventors: Ki il Kim, LA, CA (US); Sang Woo Kim, Yongin (KR); Young Kim, LA, CA (US)

(73) Assignee: K-Technology USA, Inc., Los Angeles, CA (US)

(*) Notice: Subject to any disclaimer, the term of this patent is extended or adjusted under 35 U.S.C. 154(b) by 0 days.

(21) Appl. No.: 13/748,135

(22) Filed: Jan. 23, 2013

(51) Int. Cl.
 *H02N 1/04* (2006.01)
(52) U.S. Cl.
 USPC .......................................... 310/310; 310/309
(58) Field of Classification Search
 USPC ................... 310/309, 310, 300; 322/2 R, 2 A
 IPC .......................................................... H02N 1/04
 See application file for complete search history.

(56) References Cited

U.S. PATENT DOCUMENTS

| | | | |
|---|---|---|---|
| 5,034,648 | A | 7/1991 | Gastgeb |
| 8,269,401 | B1 * | 9/2012 | Kim et al. ...................... 310/339 |
| 2008/0083139 | A1 | 4/2008 | Mullen |
| 2008/0213529 | A1 | 9/2008 | Gray et al. |
| 2010/0097292 | A1 | 4/2010 | Peczalski |
| 2010/0171393 | A1 | 7/2010 | Pei et al. |
| 2011/0148248 | A1 * | 6/2011 | Landa .......................... 310/306 |
| 2012/0133247 | A1 * | 5/2012 | Lee et al. ...................... 310/339 |
| 2013/0049531 | A1 * | 2/2013 | Wang et al. ................... 310/309 |

OTHER PUBLICATIONS

Georgia Institute of Technology, Plastic Power: Triboelectric Generator Produces Electricity by Harnessing Frictional Forces Between Transparent Polymer Surfaces, Jul. 9, 2012.*
Wang et al., Nanoscale Triboelectric-Effect-Enabled Energy Conversion for Sustainably Powering Portable Electronics, School of Materials Science and Engineering, Georgia Institute of Technology, Nov. 6, 2012.*
Flexible triboelectric generator!, Fan et al., Jan. 10, 2012.
Plastic Power: Triboelectric Generator Produces Electricity by Harnessing Frictional Forces Between Transparent Polymer Surfaces, Georgia Tech Research News, John Toon, Jul. 9, 2012.

* cited by examiner

*Primary Examiner* — Tran Nguyen
*Assistant Examiner* — Thomas Truong
(74) *Attorney, Agent, or Firm* — Novick, Kim & Lee, PLLC; Jae Youn Kim

(57) ABSTRACT

A graphene triboelectric charging device and a method of generating electricity by the same are provided. The device can include an electric power generating unit including a triboelectric layer, a polyester layer disposed to face the triboelectric layer, and a graphene layer interposed between the triboelectric layer and the polyester layer, a holder accommodating the electric power generating unit and having an uneven surface configured to receive a portion of the electric power generating unit when it is deformed by external force, and a friction unit disposed to face the electric power generating unit and configured to deform the electric power generating unit, wherein the friction unit is disposed to face the uneven surface.

20 Claims, 6 Drawing Sheets

GRAPHENE TRIBOELECTRIC CHARGING DEVICE AND A METHOD OF GENERATING ELECTRICITY BY THE SAME

CROSS-REFERENCES TO RELATED APPLICATIONS

This application relates to certain improvements to the subject matter of U.S. patent application Ser. No. 13/305,641 filed on Nov. 28, 2011, which is now U.S. Pat. No. 8,269,401 entitled "GRAPHENE POWER-MILL SYSTEM" to Kim et al., issued on Sep. 18, 2012. Thus, the disclosure of U.S. Pat. No. 8,269,401 is hereby incorporated by reference in its entirety.

BACKGROUND OF THE INVENTION

1. Field of the Invention

One or more embodiments of the present invention relate to a graphene triboelectric charging device and a method of generating electricity by the same.

2. Description of the Related Art

In general, a device that generates electric charges, separates the charges with opposite signs and uses the potential generated by them to drive a flow of free electrons, is called as an electric generator. The electric generator has a long history and has been developed continuously.

Energy harvesting and conversion devices have received increasing interest recently because they are likely to play a vital role in driving a self-powered device. Our daily life is full of energy. However, not all energies are harvested for use. For example, our daily activities include mechanical movements such as walking, touching, and frictionizing. However, most of these mechanical movements are not converted to usable energy. A need for such device, which can harvest these wasted energy and convert them to useful energy, has been present for a long time.

SUMMARY OF THE INVENTION

Aspects of the present invention provide a triboelectric charging device and a method of generating electricity by the same. Additional aspects will be set forth in part in the description which follows and, in part, will be apparent from the description, or may be learned by practice of the presented embodiments.

Additional aspects will be set forth in part in the description which follows and, in part, will be apparent from the description, or may be learned by practice of the presented embodiments.

According to an aspect of the present invention, there is provided a triboelectric charging device that may include an electric power generating unit including: a triboelectric layer having a triboelectric material, a polyester layer disposed to face the triboelectric layer, and a graphene layer interposed between the triboelectric layer and the polyester layer, a holder accommodating the electric power generating unit and having an uneven surface configured to receive a portion of the electric power generating unit when it is deformed, and a friction unit disposed to face the electric power generating unit and configured to deform the electric power generating unit, wherein the friction unit is disposed to face the uneven surface.

According to an aspect of the present invention, the triboelectric layer may include polydimethylsiloxane (PDMS). The triboelectric layer may also include polymethyl methacrylate (PMMA).

According to an aspect of the present invention, the polyester layer may include polyethylene terephthalate (PET). The polyester layer may also include polyethersulfone (PES).

According to an aspect of the present invention, an electric power generating unit further may include a spacer which is interposed between the graphene layer and a triboelectric layer, and the graphene layer is spaced apart from the a triboelectric layer.

According to an aspect of the present invention, the triboelectric charging device may further include a stack of a plurality of the electric power generating unit and at least each of the plurality of the electric power generating unit is electrically coupled to at least one another of the plurality of the electric power generating unit.

According to an aspect of the present invention, the electric power generating unit may further include an electrode disposed on the triboelectric layer.

According to an aspect of the present invention, the friction unit may be disposed to cover the electric power generating unit and the friction unit is aligned with the uneven surface.

According to an aspect of the present invention, the holder may be part of an electric device and the electric power generating unit is electrically coupled to an electronic component in the electric device.

According to an aspect of the present invention, the electric power generating unit may be electrically coupled to a rechargeable battery in the electric device.

According to an aspect of the present invention, the electric device may be a remote controller.

According to an aspect of the present invention, the friction unit may be coupled to a remote control button.

According to an aspect of the present invention, the friction unit may be configured to be powered by an external force of human power, wind power, water power, or electrical/mechanical power to deform the electric power generating unit with respect to the uneven surface of the holder.

According to an aspect of the present invention, the holder may further include an insulator.

According to an aspect of the present invention, the uneven surface may be a concave surface. The uneven surface is a patterned surface. The uneven surface may have a U shape cross-section. The uneven surface may have a shape of hemisphere.

According to an aspect of the present invention, the triboelectric layer may have an uneven surface.

According to an aspect of the present invention, the friction unit may be configured to be stepped on by feet or run over by automobiles.

A method of generating electricity by a triboelectric charging device according to one or more embodiments of the present invention may include providing a pressure or friction to the triboelectric charging device including, an electric power generating unit including, a triboelectric layer having a triboelectric material; a polyester layer disposed to face the triboelectric layer; and a graphene layer interposed between the triboelectric layer and the polyester layer; a holder accommodating the electric power generating unit and having a concave surface configured to receive a portion of the electric power generating unit when it is deformed; and a friction unit disposed to face the electric power generating unit and configured to deform the electric power generating unit, wherein the friction unit is disposed to face the uneven surface; and using electricity generated from the electric power generating unit.

BRIEF DESCRIPTION OF THE DRAWINGS

These and other aspects will become apparent and more readily appreciated from the following description of the embodiments, taken in conjunction with the accompanying drawings of which.

The features and advantages of the present invention will become more apparent from the detailed description set forth below when taken in conjunction with the drawings in which like reference numbers indicate identical or functionally similar elements.

DETAILED DESCRIPTION

Figure 1:
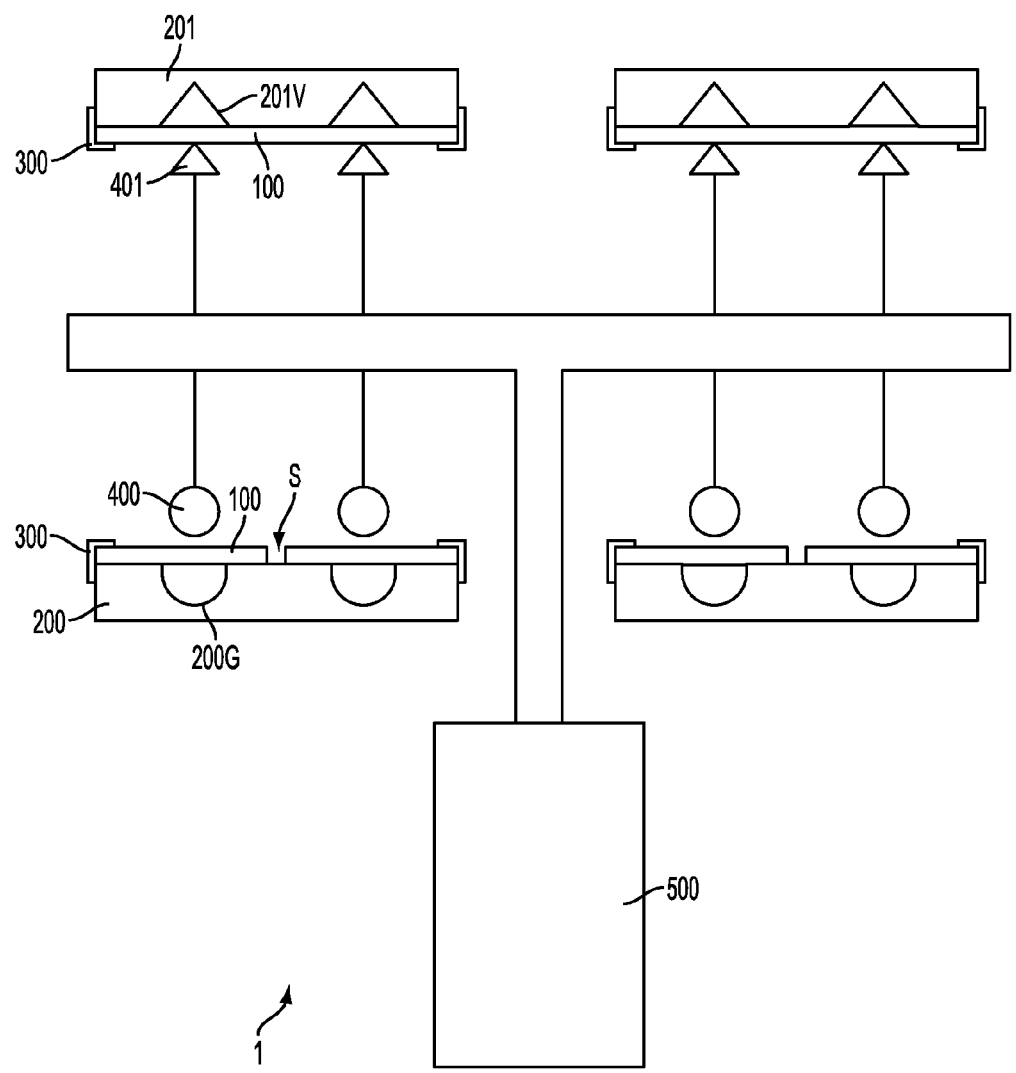
FIG. 1 is a conceptual drawing showing a triboelectric charging device according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first", "second, and the like may be used to describe various elements, but do not limit the elements. Such terms are only used to classify one element from another.

Figure 2:
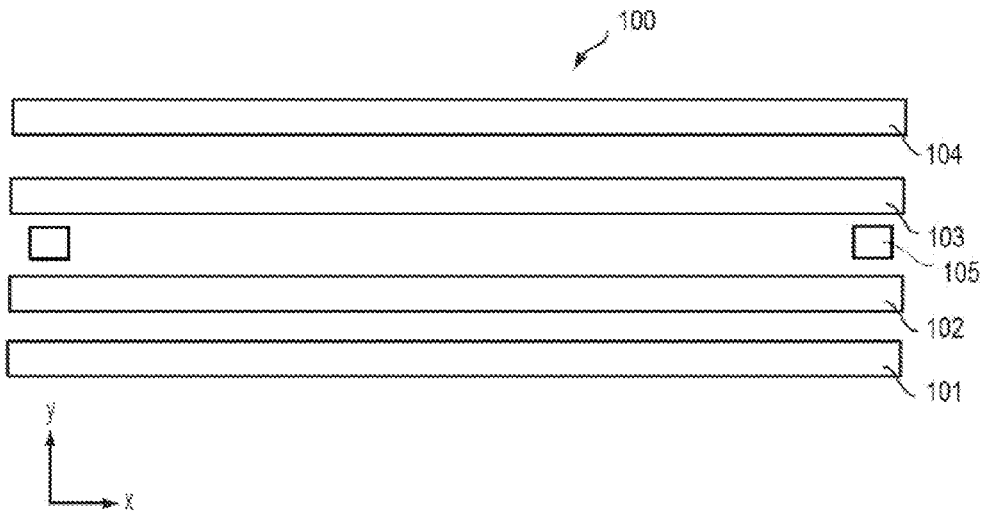
FIG. 2 is a cross-sectional view showing an electric power generating unit according to another embodiment of the present invention.

These and/or other aspects will become apparent and more readily appreciated from the following description of embodiments of the present invention, taken in conjunction with the accompanying drawings of which:

FIG. 1 is a conceptual drawing showing a graphene triboelectric charging device according to an embodiment of the present invention. FIG. 2 is a cross-sectional view showing an electric power generating unit.

Referring to FIG. 1, a graphene triboelectric charging device 1 may include an electric power generating unit 100, a holder 200, a fastener 300, and a friction unit 400. Here, the fastener 300 may be omitted. Thus, the triboelectric charging device 1 may include the electric power generating unit 100, the holder 200, and the friction unit 400.

Referring to FIGS. 1 and 2, an electric power generating unit 100 may include a triboelectric layer 102, a graphene layer 103, and a polyester layer 104. The polyester layer 104 may be disposed to face the triboelectric layer 102. The graphene layer 103 may be interposed between the triboelectric layer 102 and the polyester layer 104.

The triboelectric layer 102 may include a triboelectric material such as polydimethylsiloxane (PDMS) and/or polymethyl methacrylate (PMMA). The polyester layer 104 may include polyethylene terephthalate (PET) and/or polyethersulfone (PES).

A set of the triboelectric layer 102 and the polyester layer 104 operates as a triboelectric generator when the triboelectric layer 102 rubs against the polyester layer 104. The polyester tends to donate electrons, while the triboelectric material including PDMS and/or PMMA on the triboelectric layer 102 accepts electrons. After the triboelectric layer 102 and the polyester layer 104 scrub together, they may be mechanically separated, creating an air gap that isolates the charge on the triboelectric layer 102 surface and forms a dipole moment. If an electrical load is then connected between the triboelectric layer 102 and the polyester layer 104, a small current will flow to balance the charge potential. By continuously rubbing the triboelectric layer 102 and the polyester layer 104 and then promptly separating them, the electric power generating unit 100 can provide a small alternating current.

The graphene layer 103 may be disposed on the polyester layer 104 to face the triboelectric layer 102. Graphene has a number of remarkable mechanical and electrical properties. It is substantially stronger than steel, and it is very stretchable. The thermal and electrical conductivity is very high and it can be used as a flexible conductor. These characteristics of graphene will increase the function of the electric power generating unit 100.

The electric power generating unit 100 may further include a plurality of slits S, which prevent the electric power generating unit 100 from being rent while being pushed or bent.

The holder 200 may be configured to accommodate the electric power generating unit 100. The holder 200 is configured for engaging and holding the electric power generating unit 100 on a first side of the electric power generating unit 100. The holder 200 is configured to hold and support the electric power generating unit 100, and provides an insulation to keep the electric charges generated on the side surfaces of the electric power generating unit 100.

The holder 200 may have an uneven surface configured to receive a portion of the electric power generating unit 100 when it is deformed (pressed, rubbed or bent) by external force. The uneven surface may be a groove 200G. The groove 200G may be provided on the first side of the holder 200. The groove 200G can have any shape such that the electric power generating unit 100 can be pushed into and change its own shape for generating electricity. For example, the holder 201 may have an uneven surface such as a valley 201V having a V shape cross section. The structure of the uneven surface is not limited thereto. For example, the uneven surface may include a shape of cone in three dimension, a shape of extended V-cut across the holder 200, a U shape for a cross-section, a shape of hemisphere in three dimension, and/or a shape of extended U-cut across the holder 200. The uneven surface may have a concave surface, a patterned surface or convex shape.

The holder 200 may be made of, but not limited to, plastic. The holder 200 can include an insulator. Additionally, it must satisfy other mechanical requirements for supporting the electric power generating unit 100 in place. Further, the faster 300 may fastens the electric power generating unit 100 to the holder 200.

The friction unit 400 may be disposed to face the electric power generating unit 100 and configured to deform the electric power generating unit 100. Also, the friction unit 400 may be disposed to face the uneven surface. The friction unit 400 may have a shape fitting the groove 200G, such that the electric power generating unit 100 may be pushed by the friction unit 400 and deformed into a shape of the groove 200G, still not receiving any further strain on itself.

The friction unit 400 may include one or more elastic member (not shown) for itself. Thus, with an external force applied thereto, the friction unit 400 pushes the portion of the electric power generating unit 100 into the uneven surface such as groove 200G, and as soon as the external force is removed, the friction unit 400 would be retreated from the groove 200G making the electric power generating unit 100 recover its original shape. The friction unit 400 may be disposed to cover the electric power generating unit 100 and the friction unit 400 may be aligned with the uneven surface.

The friction unit 400 may be configured to be stepped on by feet or run over by automobiles. Thus, the triboelectric charging device 1 may be used as precast pavers on the road or sidewalk to generate electricity. Further, the friction unit 400 may be configured to be powered by an external force of human power, wind power, water power, or electrical/mechanical power.

The friction unit 400 may be connected to a driver 500. The driver may be installed such that the electric power generating unit 100 or the friction unit 400 is aligned with the uneven surface of the holder 200 in pushing and releasing. The driver 500 may provide a driving force which is oscillating back and forth. The driver 500 may be connected to a mechanical arm.

Although it is not shown in the figures, the triboelectric charging device 1 may further include a rechargeable battery for storing the generated electricity. The battery is coupled to the electric power generating unit 100 to collect the generated charges.

The holder 200 may be part of an electric device and the electric power generating unit 100 may be electrically coupled to an electronic component in the electric device including a light-emitting diode (LED) light.

Small electronic devices, such as a remote controller for television, automobile, garage door and/or boats etc., require a small amount of electricity. The electric power generating unit 100 is able to generate a small amount of electricity, and thus a device including the electric power generating unit 100 can be used as a self-powered device. While single-use batteries generate environmental pollution, the device incorporating the electric power generating unit 100 may reduce such pollution.

Referring to FIG. 2, the electric power generating unit 100 may include further a spacer 105 interposed between the triboelectric layer 102 and the polyester layer 104. The spacer 105 may be disposed between the triboelectric layer 102 and the graphene layer 103. Thus, the spacer 105 provides a structure that the graphene layer 103 may be spaced apart from the triboelectric layer 102. The layers may be put together through means such as glue (not shown) but not limited thereto.

When an external force applies to the polyester layer 104 and the graphene layer 103, the polyester layer 104 and the graphene layer 103 will be bent and make a contact with the triboelectric layer 102. After the triboelectric layer 102 and the polyester layer 104 rub together, they may be mechanically separated due to the layers' elastic properties and the spacer 105. The electric power generating unit 100 is resilient enough and, after it is deformed, it may recover an original shape, especially due to the high elastic property of the graphene layer 103.

The external force may be applied to the electric power generating unit 100 along the X, Y, Z axis directions. However, the direction of the external force is not limited thereto. The external force may be applied to the electric power generating unit 100 along a direction forming an arbitrary angle with the X, Y, Z axis directions.

The electric power generating unit 100 may include further an electrode 101. The electrode 101 may be disposed on the triboelectric layer 102. However, the location of the electrode 101 is not limited thereto. For example, the electrode 101 may be electrically coupled to either the graphene layer 103 or the polyester layer 104.

The triboelectric charging device 1 may comprise a stack of a plurality of the electric power generating unit 100 and at least each of the plurality of the electric power generating unit 100 is electrically coupled to at least one another of the plurality of the electric power generating unit 100 in parallel, in series or in a combination thereof. If necessary, the number of stacking the electric power generating unit 100 can be increased. For example, the electric power generating unit 100 may include ten electric power generating units 100.

Figure 3:
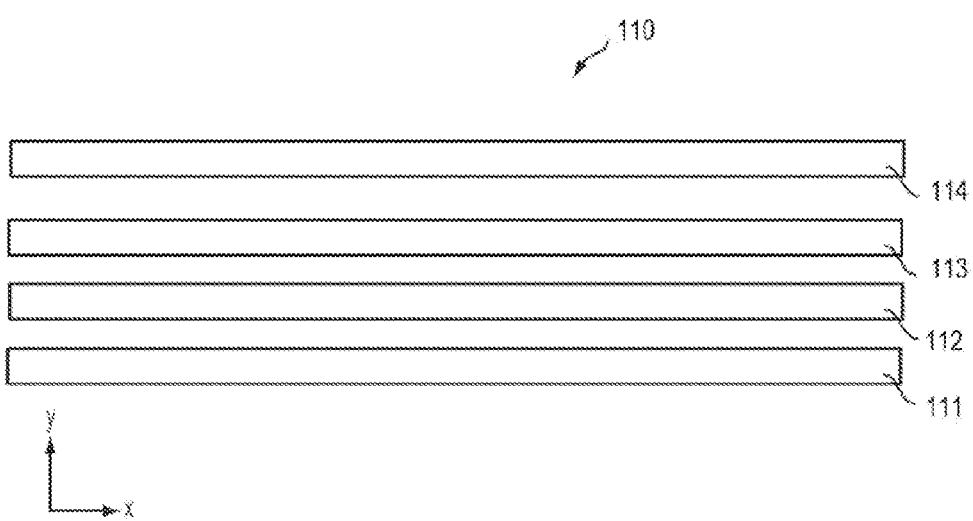
FIG. 3 illustrates another embodiment that is a variation of FIG. 2.

FIG. 3 illustrates an embodiment that is a variation of FIG. 2. Referring to FIG. 3, the electric power generating unit 110 may include an electrode 111, a triboelectric layer 112, a graphene layer 113, and a polyester layer 114. As shown in FIG. 3, the spacer 105 may be omitted.

Figure 4:
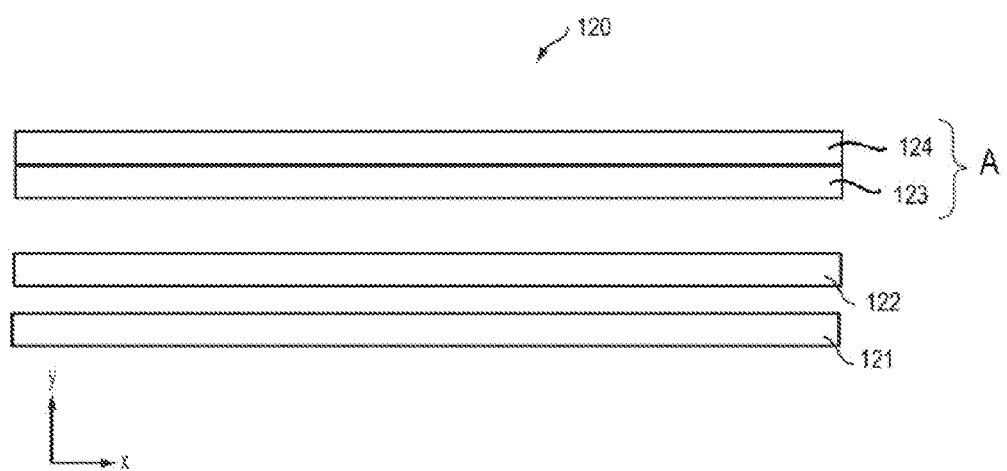
FIG. 4 illustrates another embodiment that is another variation of FIG. 2.

FIG. 4 illustrates an embodiment that is another variation of FIG. 2. Referring to FIG. 4, the electric power generating unit 120 may include an electrode 121, a triboelectric layer 122, a graphene layer 123, and a polyester layer 124. As shown in FIG. 4, the graphene layer 123 may be coated on the polyester layer 124 to form a graphene/PET layer A.

Figure 5:
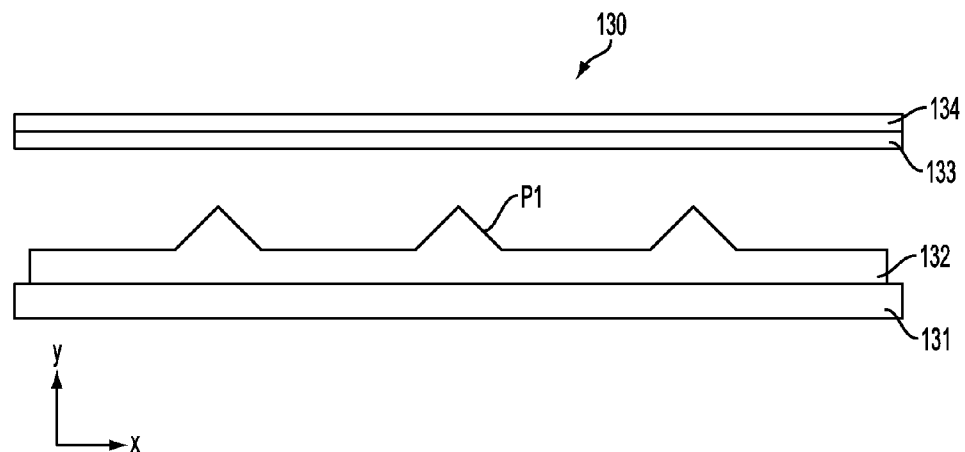
FIG. 5 illustrates another embodiment that is another variation of FIG. 2.

The triboelectric layer 132 may have an uneven surface. The triboelectric layer 132 may have a plurality of surface patterns. FIG. 5 illustrates an embodiment that is another variation of FIG. 2. Referring to FIG. 5, the electric power generating unit 130 may include an electrode 131, a triboelectric layer 132, a graphene layer 133, and a polyester layer 134. As shown in FIG. 5, the triboelectric layer 132 may have a first protrusion P1. The first protrusion has a V shape cross-section. The first protrusion may have a pyramids shape. The triboelectric layer 132 may have a plurality of the first protrusions P1.

Figure 6:
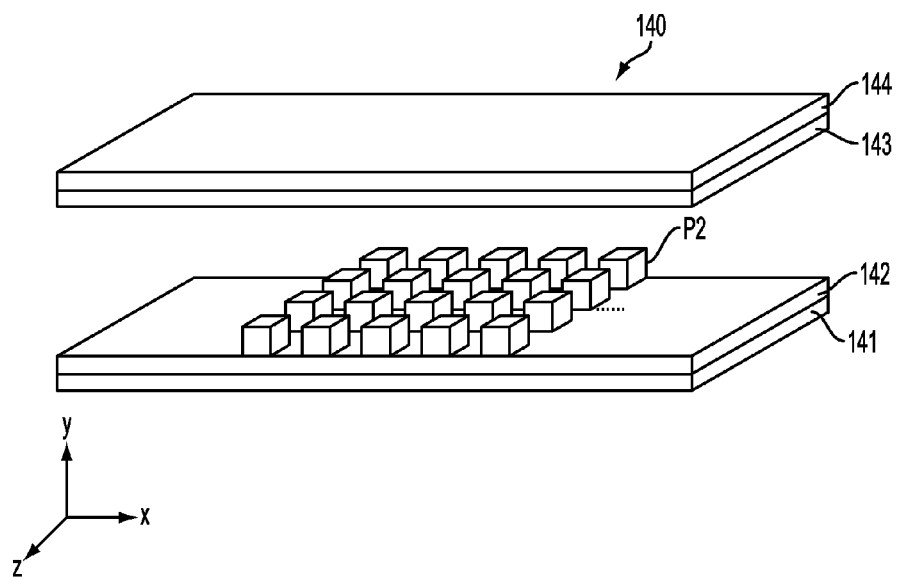
FIG. 6 is a perspective view showing another embodiment that is another variation of FIG. 2.

FIG. 6 is a perspective view showing an embodiment that is another variation of FIG. 2. Referring to FIG. 6, the electric power generating unit 140 may include an electrode 141, a triboelectric layer 142, a graphene layer 143, and a polyester layer 144. As shown in FIG. 6, the triboelectric layer 142 may have a second protrusion P2. The second protrusion has a rectangle shape cross-section. The second protrusion may have a cube shape. The triboelectric layer 142 may have a plurality of the second protrusions P2.

Figure 7:
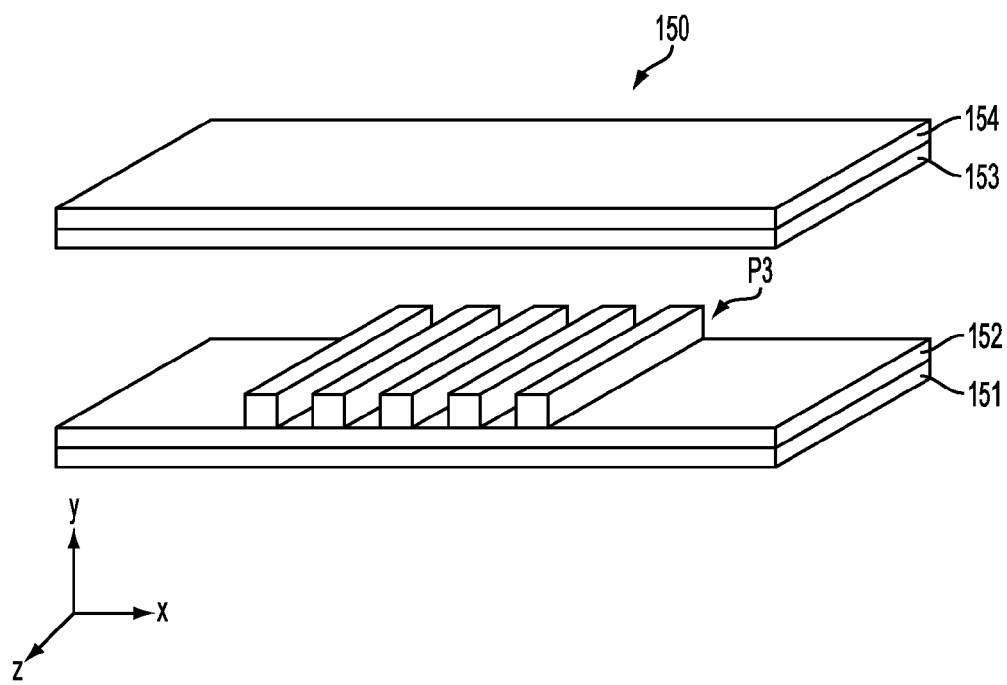
FIG. 7 is a perspective view showing another embodiment that is another variation of FIG. 2.

FIG. 7 is a perspective view showing an embodiment that is another variation of FIG. 2. Referring to FIG. 7, the electric power generating unit 150 may include an electrode 151, a triboelectric layer 152, a graphene layer 153, and a polyester layer 154. As shown in FIG. 7, the triboelectric layer 152 may have a third protrusion P3. The third protrusion has a rectangle shape cross-section. The third protrusion may have a rectangle bar shape. The triboelectric layer 152 may have a plurality of the third protrusions P3. While smooth surfaces rubbing together do generate charge, uneven surfaces rubbing together will generate charge with more efficiency.

Figure 8:
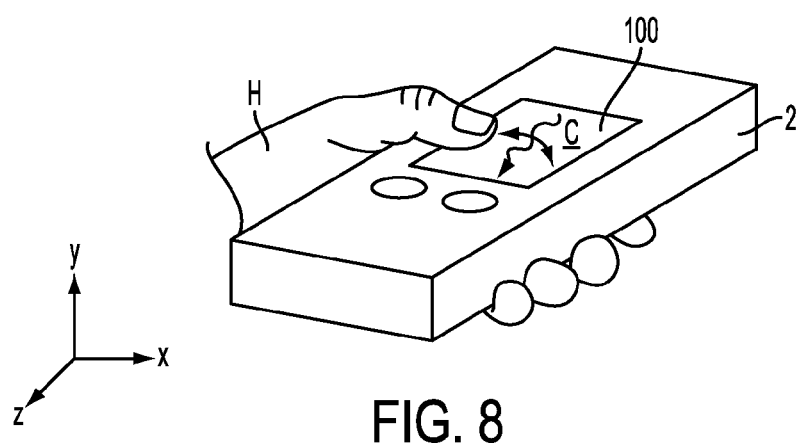
FIG. 8 is a perspective view showing an example of a remote controller according to the present invention.
Figure 9:
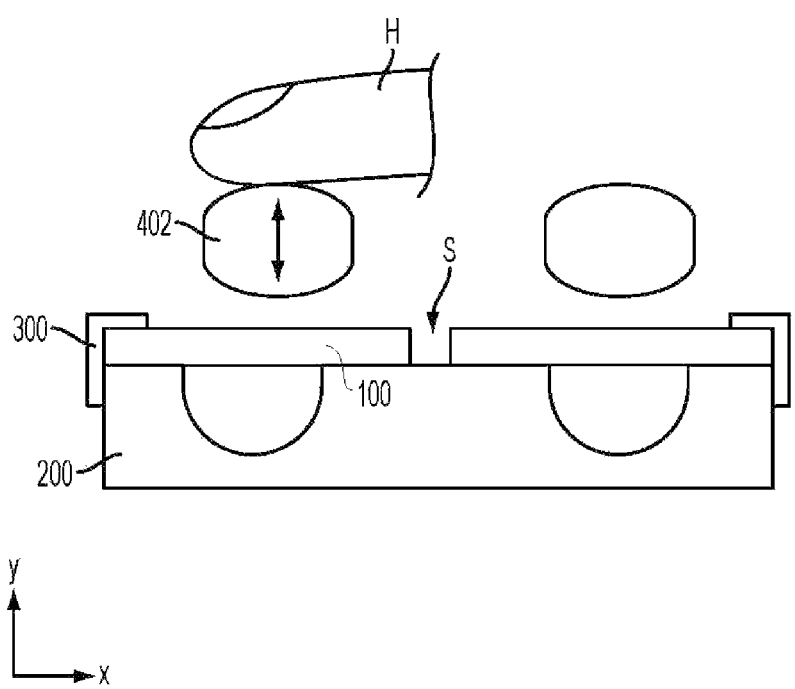
FIG. 9 is a cross-sectional view showing an example of a remote controller button according to the present invention.

FIG. 8 is a perspective view showing an example of a remote controller according to the present invention. FIG. 9 is a cross-sectional view showing an example of a remote controller button according to the present invention.

Referring to FIGS. 8 and 9, the triboelectric charging device 1 may be part of a remote controller 2 and the electric power generating unit 100 is electrically coupled to either an electronic component (not shown) in the remote controller 2 or a rechargeable battery in the remote controller.

As shown in FIG. 8, when a user applies friction and/or pressure by a hand H as denoted by arrow C onto the electric power generating unit 100, the electric power generating unit 100 generates electricity and the generated electricity can be either stored in the rechargeable battery or consumed by the electronic component in the remote controller 2.

Referring to FIG. 9, the triboelectric charging device 1 is applied to a remote control key pad including a friction unit 402, e.g., a button. FIG. 9 shows the electric power generating unit 100, the holder 200, the fastener 300, the friction unit 402 and slit S. When a user's hand H presses the friction unit 402, which is a part of the key pad, the electric power generating unit 100 generates electricity, which can be either stored in the rechargeable battery or consumed by the electronic components in the remote controller.

A method of generating electricity by a triboelectric charging device according to one or more embodiments of the present invention includes providing a pressure or friction to the triboelectric charging device including: an electric power generating unit including: a triboelectric layer having a triboelectric material, a polyester layer disposed to face the triboelectric layer, and a graphene layer interposed between the triboelectric layer and the polyester layer, a holder accommodating the electric power generating unit and having a concave surface configured to receive a portion of the electric power generating unit when it is deformed (pressed, rubbed or bent) by external force, and a friction unit disposed to face the electric power generating unit and configured to deform the electric power generating unit, wherein the friction unit is disposed to face the uneven surface, and using electricity generated from the electric power generating unit.

It should be understood that the exemplary embodiments described therein should be considered in a descriptive sense only and not for purposes of limitation. Descriptions of features or aspects within each embodiment should typically be considered as available for other similar features or aspects in other embodiments.

What is clamed is:

1. A graphene triboelectric charging device comprising:
   at least one electric power generating unit including:
      a triboelectric layer having a triboelectric material;
      a polyester layer disposed to face the triboelectric layer; and
      a graphene layer interposed between the triboelectric layer and the polyester layer;
   at least one holder accommodating the at least one electric power generating unit and having an uneven surface configured to receive a portion of the at least one electric power generating unit when the at least one electric power generating unit is deformed; and
   at least one friction unit disposed to face the at least one electric power generating unit and the uneven surface, and configured to deform the at least one electric power generating unit.

2. The graphene triboelectric charging device of claim 1, wherein the triboelectric material comprises polydimethylsiloxane (PDMS).

3. The graphene triboelectric charging device of claim 1, wherein the triboelectric material comprises polymethyl methacrylate (PMMA).

4. The graphene triboelectric charging device of claim 1, wherein the polyester layer comprises polyethylene terephthalate (PET).

5. The graphene triboelectric charging device of claim 1, wherein the polyester layer comprises polyethersulfone (PES).

6. The graphene triboelectric charging device of claim 1, wherein the at least one electric power generating unit further comprises a spacer interposed between the graphene layer and the triboelectric layer, and the graphene layer is spaced apart from the triboelectric layer.

7. The graphene triboelectric charging device of claim 1, wherein the at least one electronic power generating unit comprises a plurality of electric power generating units, and each of the plurality of the electric power generating units is electrically coupled to at least one another of the plurality of the electric power generating units.

8. The graphene triboelectric charging device of claim 1, wherein the at least one electric power generating unit further comprises an electrode disposed on the triboelectric layer.

9. The graphene triboelectric charging device of claim 1, wherein the at least one friction unit is disposed to cover the at least one electric power generating unit and is aligned with the uneven surface.

10. The graphene triboelectric charging device of claim 1, wherein the at least one holder is part of an electric device, and the at least one electric power generating unit is electrically coupled to an electronic component in the electric device.

11. The graphene triboelectric charging device of claim 10, wherein the at least one electric power generating unit is electrically coupled to a rechargeable battery in the electric device.

12. The graphene triboelectric charging device of claim 10, wherein the electric device is a remote controller.

13. The graphene triboelectric charging device of claim 12, wherein the at least one friction unit is coupled to a remote control button of the remote controller.

14. The graphene triboelectric charging device of claim 1, wherein the at least one friction unit is configured to be powered by an external force of human power, wind power, water power, or electrical/mechanical power to deform the at least one electric power generating unit with respect to the uneven surface of the holder.

15. The graphene triboelectric charging device of claim 1, wherein the at least one holder further comprises an insulator.

16. The graphene triboelectric charging device of claim 1, wherein the uneven surface is a concave surface.

17. The graphene triboelectric charging device of claim 1, wherein the uneven surface has a U shape cross-section.

18. The graphene triboelectric charging device of claim 1, wherein the triboelectric layer has protrusions located on one side facing the graphene layer, and the protrusions have one of a pyramid shape, a cube shape, a rectangle bar shape, or a cone shape.

19. The graphene triboelectric charging device of claim 1, wherein the at least one friction unit is configured to be stepped on by feet or run over by automobiles.

20. A method of generating electricity by a graphene triboelectric charging device, the method comprising:
   providing a pressure or friction to the triboelectric charging device comprising:
      an electric power generating unit comprising:
         a triboelectric layer having a triboelectric material;
         a polyester layer disposed to face the triboelectric layer; and a graphene layer interposed between the triboelectric layer and the polyester layer;
a holder accommodating the electric power generating unit and having a concave surface configured to receive a portion of the electric power generating unit when the electric power generating unit is deformed; and
a friction unit disposed to face the electric power generating unit and configured to deform the electric power generating unit, wherein the friction unit is disposed to face the uneven surface; and using electricity generated from the electric power generating unit.

* * * * *